US009147319B2

(12) United States Patent
Chim

(10) Patent No.: US 9,147,319 B2
(45) Date of Patent: Sep. 29, 2015

(54) METHOD OF COMMUNITY GAMING BASED ON ELEMENTS COLLECTED IN A BASE GAME AND A GAMING SYSTEM

(75) Inventor: Chi We Chim, Beecroft (AU)

(73) Assignee: Aristocrat Technologies Australia Pty Limited (AU)

( * ) Notice: Subject to any disclaimer, the term of this patent is extended or adjusted under 35 U.S.C. 154(b) by 0 days.

(21) Appl. No.: 12/891,929

(22) Filed: Sep. 28, 2010

(65) Prior Publication Data

US 2011/0077068 A1 Mar. 31, 2011

(30) Foreign Application Priority Data

Sep. 28, 2009 (AU) ................................ 2009904746

(51) Int. Cl.

*A63F 9/24* (2006.01)
*A63F 13/00* (2014.01)
*G07F 17/32* (2006.01)

(52) U.S. Cl.

CPC ........ *G07F 17/3267* (2013.01); *G07F 17/3244* (2013.01); *G07F 17/3276* (2013.01); *G07F 17/3293* (2013.01)

(58) Field of Classification Search

USPC ....................................... 273/292; 463/16, 20
See application file for complete search history.

(56) References Cited

U.S. PATENT DOCUMENTS 6,010,405 A * 1/2000 Morawiec ........................ 463/33
7,297,057 B2 * 11/2007 Gerrard et al. .................. 463/13
7,654,532 B2 * 2/2010 Feola ............................ 273/292
2006/0111170 A1 * 5/2006 Hornik et al. ................... 463/16
2006/0116194 A1 * 6/2006 Pacey et al. ..................... 463/20
2006/0258425 A1 * 11/2006 Edidin et al. .................... 463/16
2007/0032284 A1 * 2/2007 Englman ......................... 463/13
2008/0026832 A1 * 1/2008 Stevens et al. .................. 463/26
2008/0039174 A1 * 2/2008 Litman ........................... 463/20
2008/0293478 A1 * 11/2008 Anderson et al. ............... 463/25
2009/0124340 A1 * 5/2009 Visser ............................ 463/20
2009/0233689 A1 * 9/2009 Saito .............................. 463/20
2010/0025931 A1 * 2/2010 Walker et al. ................. 273/292
2010/0081492 A1 * 4/2010 Marks et al. .................... 463/13
2010/0137047 A1 * 6/2010 Englman et al. .................. 463/6
2011/0130192 A1 * 6/2011 Englman et al. ................ 463/20

* cited by examiner

*Primary Examiner* — Jason Yen
(74) *Attorney, Agent, or Firm* — McAndrews, Held & Malloy, Ltd.

(57) ABSTRACT

A method of community gaming comprising: collecting at least one element in a main game for eligibility into a community game by at least one player; and conducting the community game for each eligible player, in which each collected element is employed in determining the community game outcome.

20 Claims, 8 Drawing Sheets

METHOD OF COMMUNITY GAMING BASED ON ELEMENTS COLLECTED IN A BASE GAME AND A GAMING SYSTEM

RELATED APPLICATIONS

This application claims priority to Australian Patent Application No. 2009904746, having a filing date of Sep. 28, 2009, which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention relates to a method of community gaming and a gaming system.

Current electronic gaming machines allow a player to place a wager or bet, in return for which a play of a main game provided by the gaming machine is conducted. Some gaming machines allow entry into further game, such as a community game conducted for eligible players. In this case, the community game may comprise a different game to the main game with different rules.

While such gaming systems provide users with enjoyment, a need exists for alternative gaming systems to provide users with further enjoyment.

BRIEF SUMMARY OF THE INVENTION

In a first aspect, the invention provides a method of community gaming comprising:

collecting at least one element in a main game for eligibility into a community game by at least one player; and conducting the community game for each eligible player, in which each collected element is employed in determining the community game outcome.

In a second aspect, the invention provides a gaming system comprising:

a display;

a game play mechanism operable by at least one player to input a main game wager and to receive input from each player to collect elements in a main game; and at least one main game controller arranged to conduct the main game to collect at least one element for eligibility into a community game by the at least one player; and a community game controller arranged to conduct the community game for eligible players, in which each collected element is employed in determining the community game outcome.

In a third aspect, the invention provides a gaming system comprising:

a plurality of gaming devices; and means for conducing a main game for each gaming device in which at least one element is collected to determine eligibility into a community game; and means for conducting the community game for eligible gaming devices, in which each collected element is employed in determining the community game outcome.

In a fourth aspect, the invention provides a gaming system comprising:

a plurality of gaming devices, each gaming device comprising a display having symbol display positions;

a main game controller arranged to conduct a main game for one of said gaming devices and to select symbols for display in the symbol display positions, the main game controller comprising an eligibility determiner to determine whether symbols selected for display in the symbol display positions correspond to an element to be collected for eligibility into a community game; and a community game controller arranged to conduct the community game for eligible gaming devices, in which each collected element is employed in determining an outcome of the community game.

In a fifth aspect, the invention provides a method of community gaming comprising:

collecting at least one element in a main game for eligibility into a community game by at least one player; and conducting the community game for each eligible player when a start condition is met, in which each collected element is employed in determining the community game outcome and wherein there are a plurality of collections of elements.

In a sixth aspect, the invention provides a gaming system comprising:

a display;

a game play mechanism operable by at least one player to input a main game wager and to receive input from each player to collect elements in a main game; and at least one main game controller arranged to conduct the main game to collect at least one element for eligibility into a community game by the at least one player; and a community game controller arranged to conduct the community game for eligible players when a start condition is met, in which each collected element is employed in determining the community game outcome and wherein there are a plurality of collections of elements.

In a seventh aspect, the invention provides a gaming system comprising:

a plurality of gaming devices; and a means for conducing a main game for each gaming device in which at least one element is collected to determine eligibility into a community game; and a means for conducting the community game when a start condition is met for eligible gaming devices, in which each collected element is employed in determining the community game outcome and wherein there are a plurality of collections of elements.

In an eighth aspect, the invention provides a gaming system comprising:

a plurality of gaming devices, each gaming device comprising a display having symbol display positions;

a main game controller arranged to conduct a main game for one of said gaming devices and to select symbols for display in the symbol display positions, the main game controller comprising:

- an eligibility determiner to determine whether symbols selected for display in the symbol display positions correspond to an element to be collected for eligibility into a community game and wherein there are a plurality of collections of elements; and
- a start condition determiner to determine when a start condition is met in the main game for eligible gaming devices; and a community game controller arranged to conduct the community game for eligible gaming devices when the start condition is met, in which each collected element is employed in determining an outcome of the community game.

In a ninth aspect, the invention provides a gaming system comprising:

a plurality of electronic gaming machines each comprising a cabinet, a display mounted within the cabinet, at least one game play mechanism mounted to the cabinet and a main game controller disposed within the cabinet comprising a processor and a memory storing game control instructions which enable each main game controller operating in response to operation of a respective at least one game play mechanism by a player to conduct a respective main game to collect at least one element for eligibility into a community game; and a community game controller operably connected to the electronic gaming machines, the community game controller comprising a processor and a memory storing additional game control instructions which when executed cause the community game controller to conduct the community game for eligible electronic gaming machines when a start condition is met, in which each collected element is employed in determining the community game outcome and wherein there are a plurality of collections of elements.

In a tenth aspect, the invention provides computer program code which when executed implements the above method.

In an eleventh aspect, the invention provides a tangible computer readable medium comprising the above program code.

In a twelfth aspect, the invention provides transmitting or receiving the above program code.

BRIEF DESCRIPTION OF SEVERAL VIEWS OF THE DRAWINGS

An exemplary embodiment of the invention will now be described with reference to the accompanying drawings in which.

DETAILED DESCRIPTION OF THE INVENTION

Figure 1:
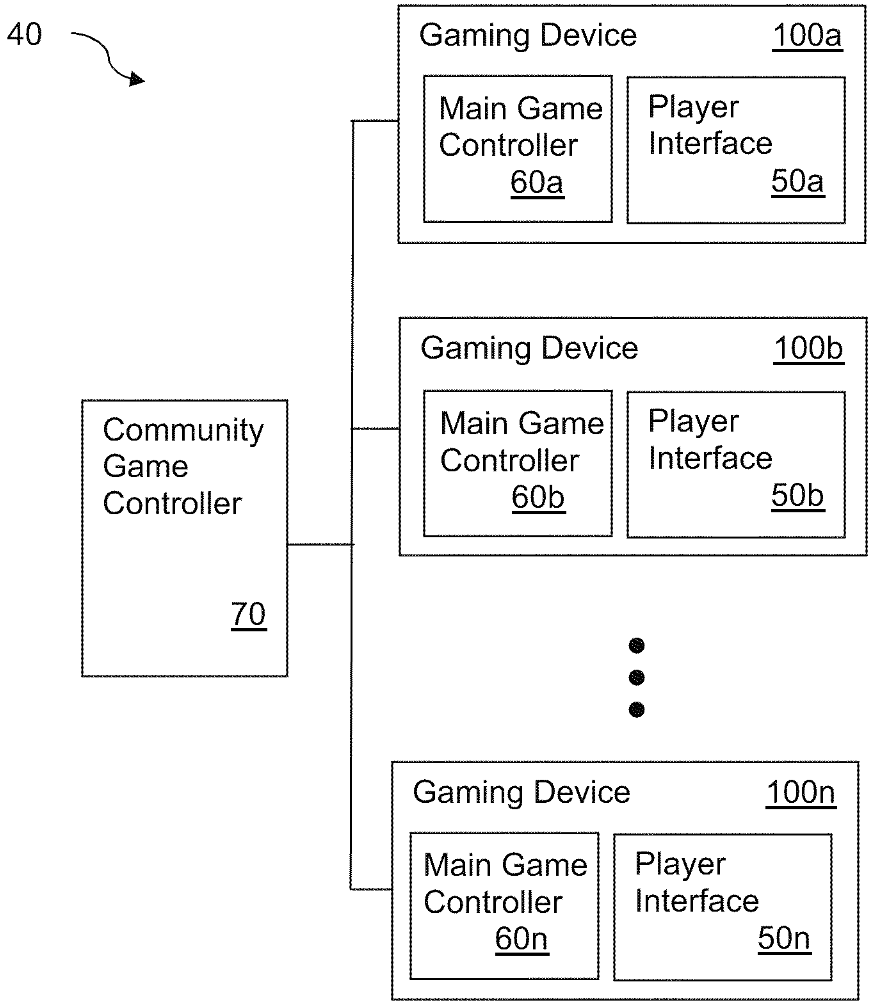
FIG. 1 is a block diagram of a gaming system.

Referring to the drawings, there is shown a method of community gaming and a gaming system for implementing the method. In one aspect, the method of gaming includes collecting at least one element in a main game for eligibility into a community game and each collected element being employed in determining the game outcome of the community game. In another aspect, the method of gaming includes conducting the community game for eligible gaming devices when a start condition is met.

General System Configuration

Depending on the embodiment, the gaming system may take a number of different forms. In one form, shown in FIG. 1, the gaming system 40 includes a community game controller 70. The community game controller 70 is in communication with a plurality of gaming devices 100*a*, 100*b*, . . . , 100*n*, where the communication may include data communication over a network. The community game controller 70 may be arranged to conduct a community game for each eligible player of respective gaming machines. In an embodiment, each gaming device may have respective main game controllers 60*a*, 60*b*, . . . , 60*n* arranged to conduct a main game for each player of respective gaming devices and where the main game includes collecting elements for eligibility into the community game. In another embodiment, each gaming device may have respective player interfaces 50*a*, 50*b*, . . . , 50*n*, including game play mechanisms to allow respective player input in the main game and the community game. Furthermore, the elements collected in the main game may be employed by the community game controller 70 to determine the community game outcome for eligible players.

Gaming Devices

Herein, the term gaming device is used to refer to any device used by a player to play a game and specifically includes stand alone gaming machines and interactive video terminals which implement games in a client/server architecture.

Figure 2:
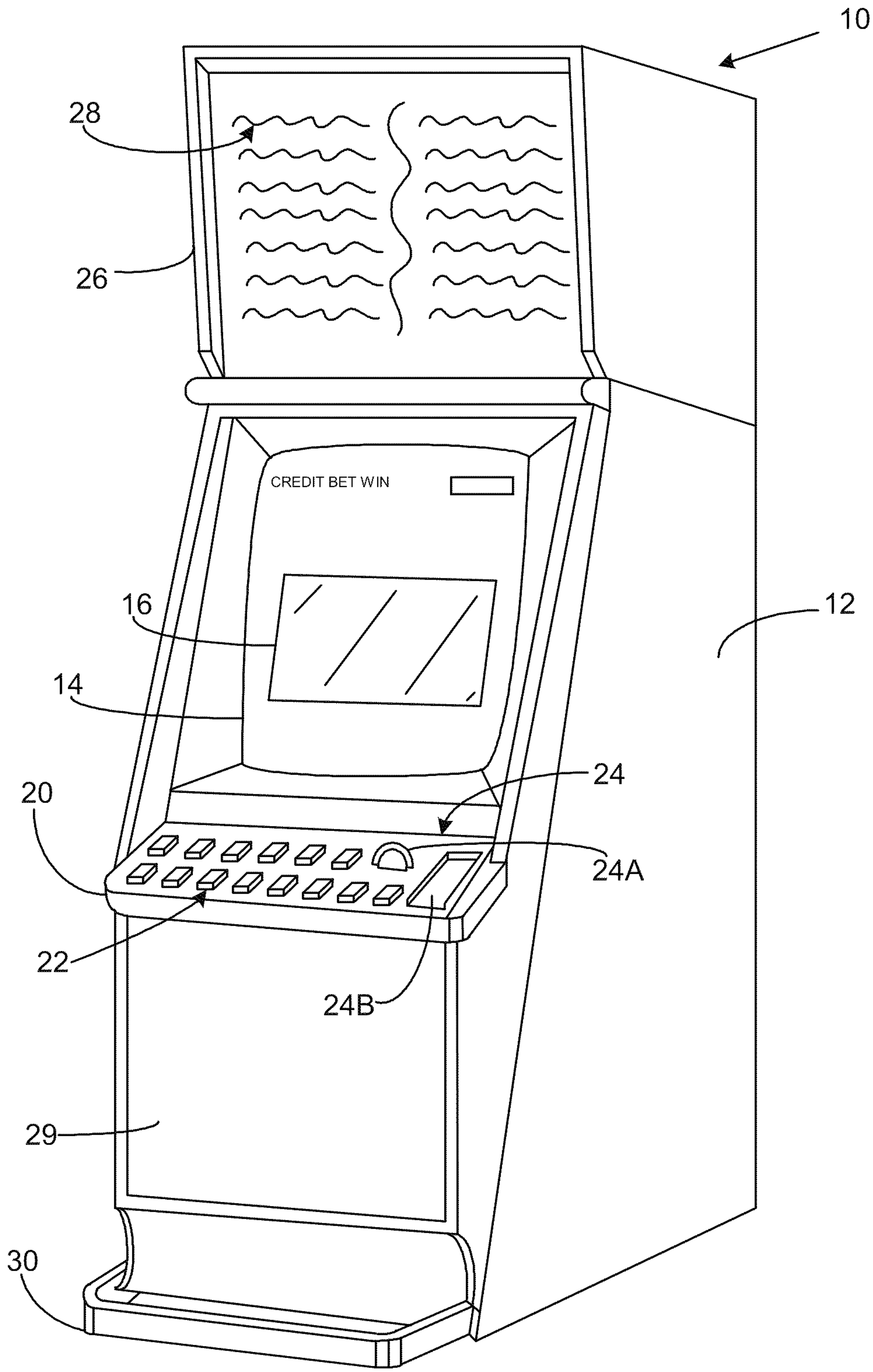
FIG. 2 is a perspective view of a stand alone gaming machine.

A gaming device in the form of a stand alone gaming machine 10 is illustrated in FIG. 2. The gaming machine 10 includes a console 12 having a display 14 on which are displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. Other gaming machines may be configured for ticket in that they have a ticket reader for reading tickets having a value and crediting the player based on the face value of the ticker. A player marketing module (not shown) having a reading device may also be provided for the purpose of reading a player tracking device, for example as part of a loyalty program. The player tracking device may be in the form of a card, flash drive or any other portable storage medium capable of being read by the reading device. In some embodiments, the player marketing module may provide an additional credit mechanism, either by transferring credits to the gaming machine from credits stored on the player tracking device or by transferring credits from a player account in data communication with the player marketing module.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
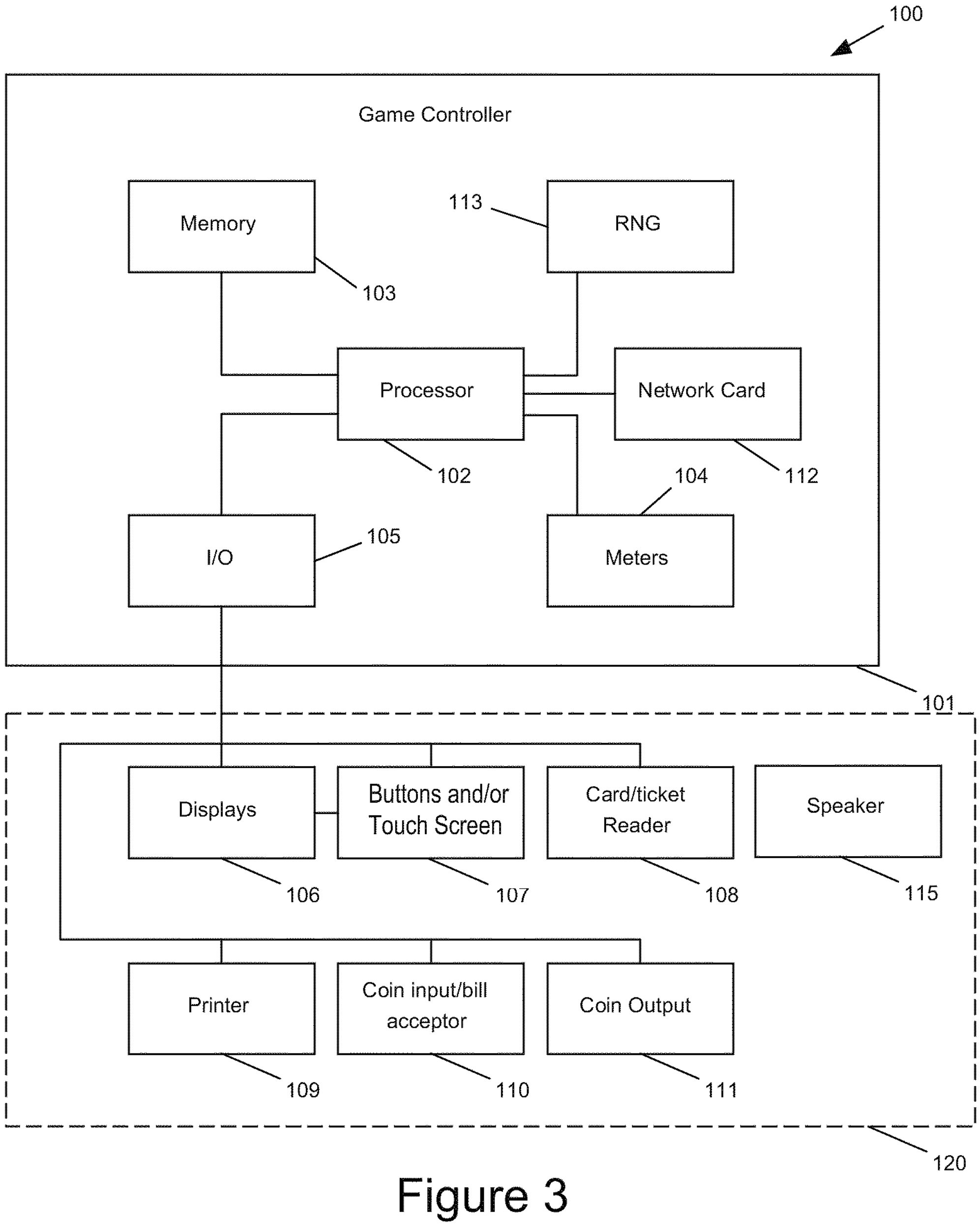
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102 mounted on a circuit board. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine 100 has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 including one or more displays 106, a touch screen and/or buttons 107 (which provide a game play mechanism), a card and/or ticket reader 108, a printer 109, a bill acceptor and/or coin input mechanism 110, a coin output mechanism 111, and at least one speaker 115. Additional hardware may be included as part of the gaming machine 100, or hardware may be omitted as required for the specific implementation. For example, while buttons or touch screens are typically used in gaming machines to allow a player to place a wager and initiate a play of a game any input device that enables the player to input game play instructions may be used. For example, in some gaming machines a mechanical handle is uses to initiate a play of the game. Persons skilled in the art will also appreciate that a touch screen can be used to emulate other input devices, for example, a touch screen can display virtual buttons which a player can "press" by touching the screen where they are displayed.

The game controller 101 determines based on game rules stored in memory 103, the outcomes of games including whether to award a win to a player.

In addition, the gaming machine 100 may include a communications interface, for example a network card 112. The network card may, for example, send status information, accounting information or other information to a bonus controller, central controller, server or database and receive data or commands from the bonus controller, central controller, server or database. In embodiments employing a player marketing module, communications over a network may be via player marketing module—i.e. the player marketing module may be in data communication with one or more of the above devices and communicate with it on behalf of the gaming machine.

Figure 4:
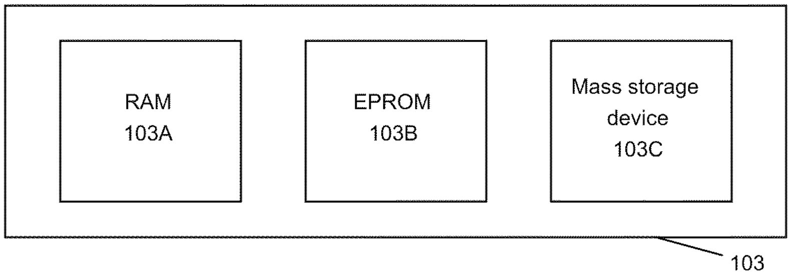
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

A gaming device as indicated above may also be a gaming client of a client/server architecture where a portion of the game is executed on the client and a portion of the game is executed on the server. In such embodiments, the client typically takes the form of an interactive video terminal which has a similar outward appearance to the gaming machine described above but the terminal is only responsible for limited functions, for example rendering graphically game outcomes generated by a server. Further detail of a client/server gaming architecture may be found in WO 2006/052213 and WO 2007/086779, the disclosures of which are incorporated herein by reference.

Further Detail of Gaming System and Method

Figure 5:
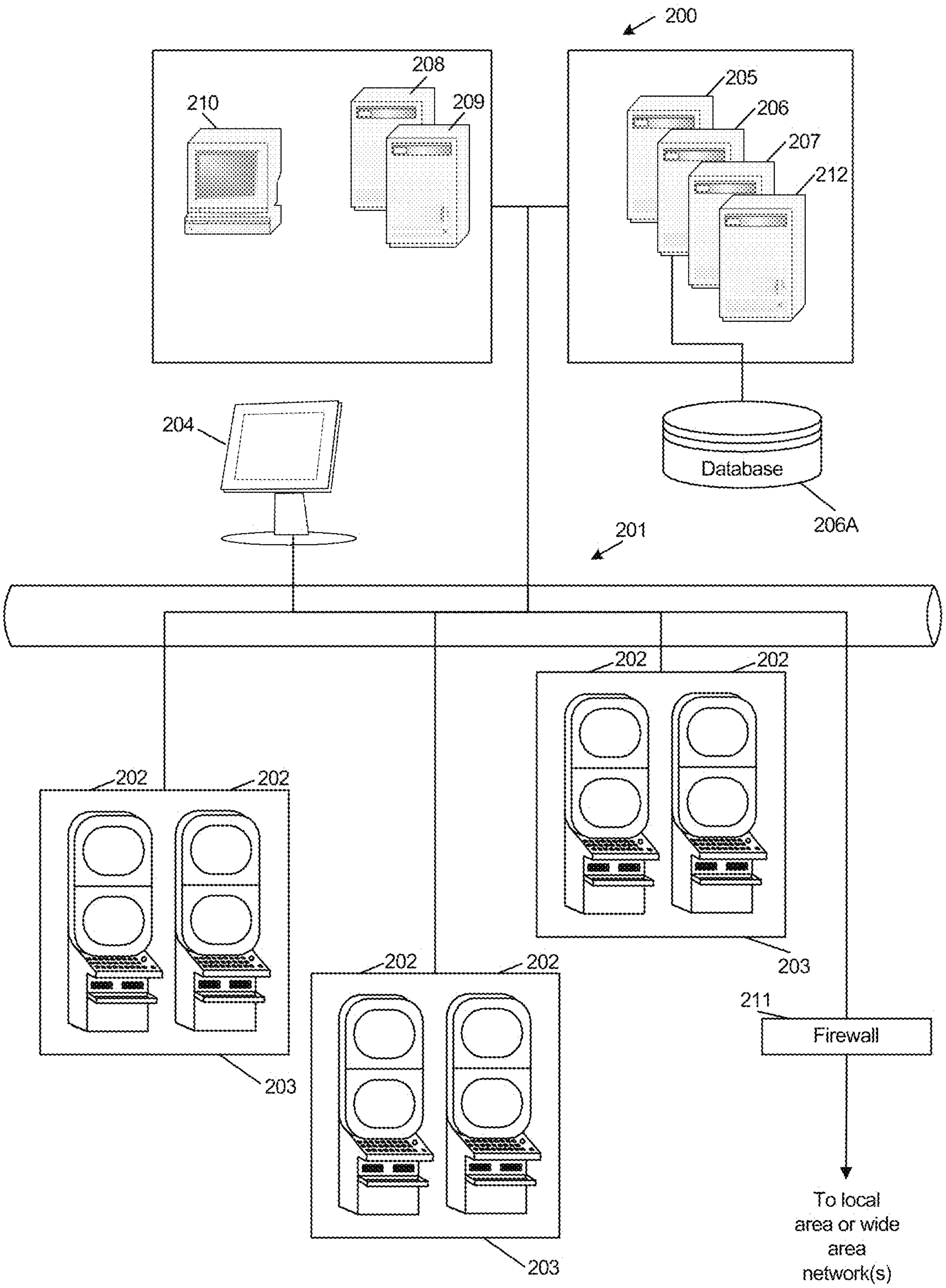
FIG. 5 is a schematic diagram of a network gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

In an embodiment, the game server 205 provides a community game controller 70 to conduct a community game for the plurality of gaming machines, in addition to a main game conducted on the gaming devices by respective game controllers, herein referred to as main game controllers 60.

A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming network 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of game servers could be provided to run different games or a single game server may run a plurality of different games as required by the terminals.

In an embodiment, the game server 205 provides a community game controller 70 to conduct a community game for one or more gaming machines 202, if they are determined to be eligible. A community game may have different game rules, which may be stored in database 206A, to a main game played on the plurality of gaming machines however it is to be appreciated that these rules may be the same. Also, community games may enable players of gaming machines to either play against other players, against a computer generated opponent, typically generated by the game server 205, or compete to achieve a predetermined outcome, such as designated symbol sequences. For example, if the community game is a stud poker type game, the player will compete to make the highest poker ranked hand to obtain the highest payout.

It would be appreciated by a person skilled in the art that eligibility into a community game may be determined from an event occurring in the main game and may be determined by either the respective main game controllers 60 or the server provided community game controller 70. In one embodiment, players of gaming machines collect elements in the main game for eligibility into a community game and these elements are subsequently employed in determining the community game outcome for each player. In the example where the community game is a poker game, the elements collected in the main game may correspond to a pair of playing cards symbols.

Figure 6:
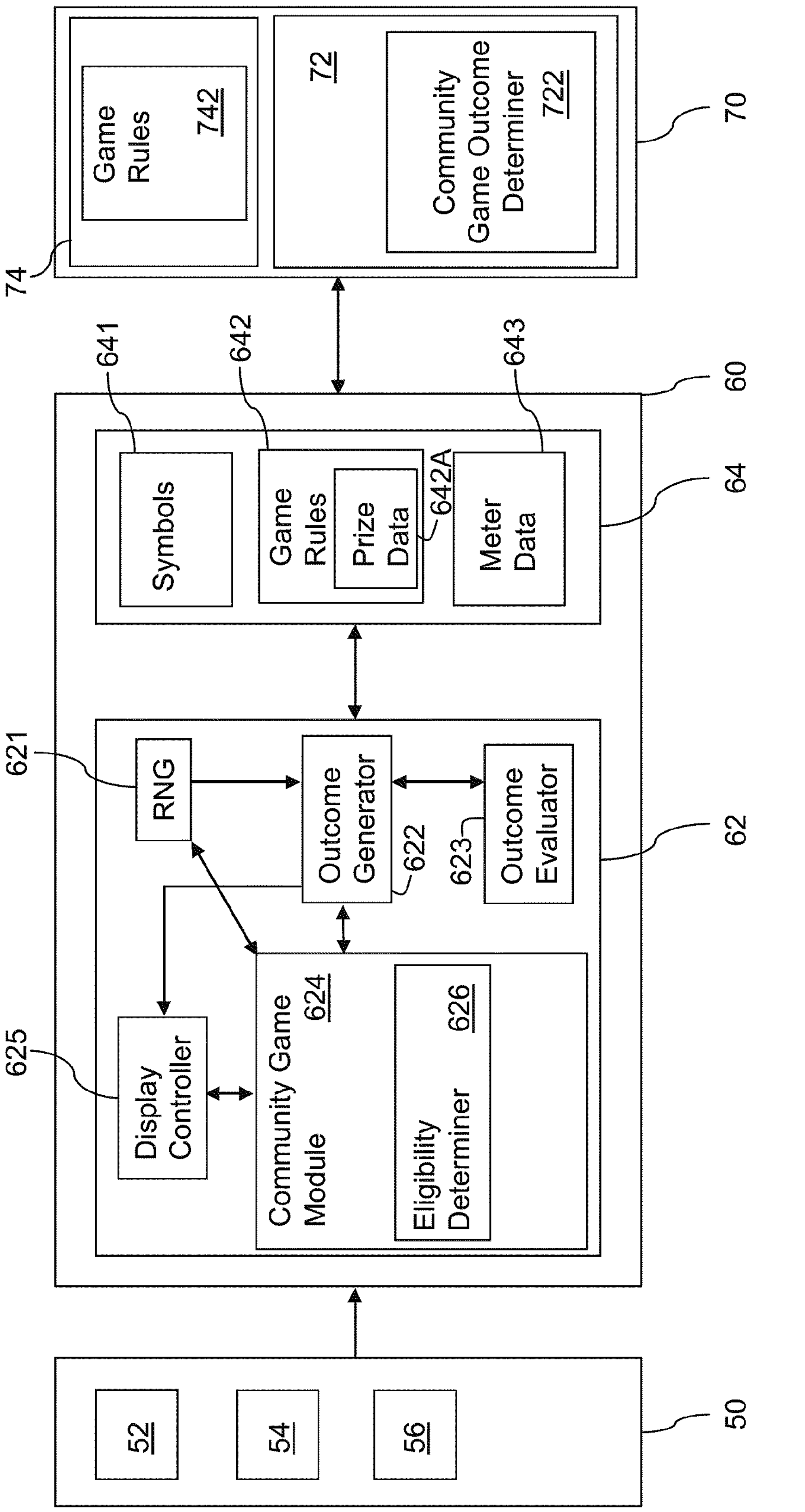
FIG. 6 is a block diagram of a gaming system.
Figure 7:
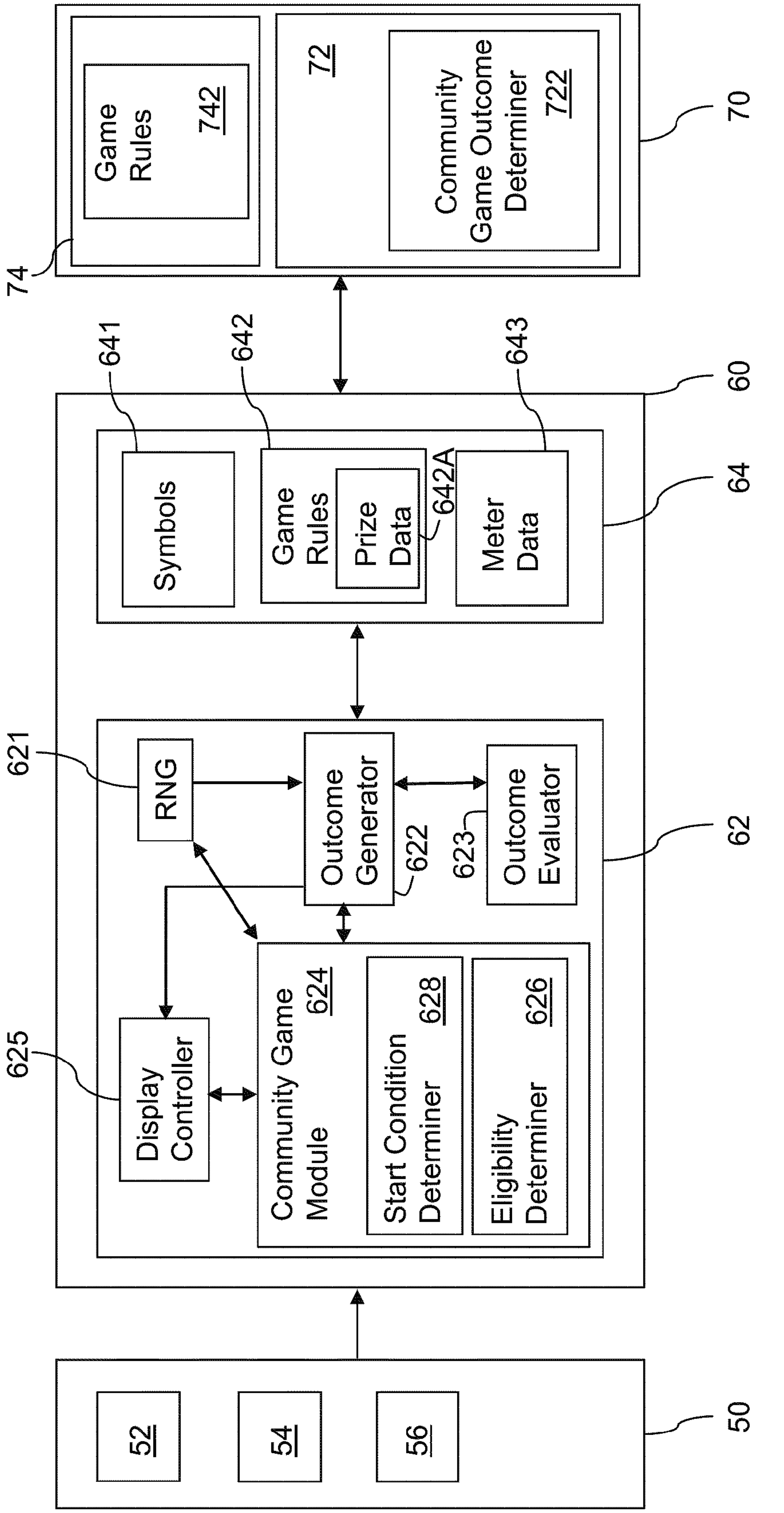
FIG. 7 is a further block diagram of a gaming system.

Referring now to FIGS. 6 and 7, shown is a single gaming device with player interface 50 and main game controller 60 in communication with a community game controller 70. It would be appreciated by those skilled in the art that the community game controller 70 may be provided by the game server 205 as described above.

The player operates game play mechanism 56 of the player interface 50 to make a selection and input game instructions, selected from a plurality of available instructions, to the main game controller 60. The player interface 50 may vary from embodiment to embodiment but will typically include a credit mechanism 52 to enable a player to input credits and receive payouts, one or more displays 54, the game play mechanism 56, and one or more speakers (not shown). The game play mechanism 56 of the player interface 50 may be in the form of an input device such as a touch screen and/or buttons to input player instructions to the main game controller 60.

The main game controller 60 is in data communication with the player interface 50 and typically includes a processor 62 to process game play instructions in accordance with game play rules and outputs game play outcomes to the display. Typically, the game play rules are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server.

In an embodiment, the main game controller 60 conducts a main game where a player of a gaming device collects at least one element during play of the game for eligibility into a community game. The community game controller 70 includes a processor 72 and a memory 74, and conducts the community game for each eligible player to determine a game outcome in which each collected element is employed in determining the community game outcome. For example, if the community game is a poker type game and the collected element is a pair of playing card symbols, e.g. two aces, the pair of aces are employed in the community game to attempt to form the highest ranking poker hand and thus be made a community game award. It would be appreciated by those skilled in the art that the poker ranking of the collected card symbols affects the probability of making a community game award. For example, a pair of aces collected in the main game provides the player with the highest probability of obtaining the highest valued poker hand in the community game and thus being made a community game award.

In one embodiment, the main game is conducted by each gaming machine 202 and an outcome generator 622 operates in response to the player's operation of game play mechanism 56 to generate a main game outcome which will then be evaluated by outcome evaluator 623 and a community game module 624 incorporated within the main game controller 60. In an embodiment, the outcome evaluator 623 evaluates the generated game outcome for the main game and the community game module 624 includes an eligibility determiner 626 to evaluate the game outcome to determine whether one or more symbols in the main game correspond to an element to be collected for eligibility to play a community game. The status of eligibility, or element collection, may be displayed on the display 54 via the display controller 625.

In the example of a community poker type game, the eligibility determiner 626 determines if one or more symbols corresponding to a pair of playing card symbols occur in the game outcome of the main game for eligibility into a community game. In another example, the eligibility determiner 626 determines if one or more symbols corresponding to a picture playing card symbol occur in the main game outcome for eligibility. In any event, the eligibility determiner 626 communicates eligibility to the community game controller 70 so that the community game can be conducted for eligible players.

In another embodiment, the determination of eligibility into a community game may be made at the game server 205 and thus at the provided community game controller 70. In the case, data could be sent from the game server 205 to each community game module 624 to indicate status of the community game and status of each player's eligibility.

In one example, a player of a gaming machine may collect multiple elements for eligibility, as determined by the eligibility determiner 626. For example, a player may collect elements corresponding to multiple pairs of playing card symbols. In this case, the community game module 624 sends data to the community game controller 70 to indicate the multiple eligibility of the player and displays this to the player via display controller 625. The player of the gaming machine may then be given options to either play multiple entries in one community game, successive entries in multiple community games, or any combination thereof.

In an embodiment, the outcome generator 622 generates the main game outcome by employing random number generator 621 to randomly select symbols from a set of symbols specified by symbol data 641. The selected symbols are advised to the display controller 625 which causes them to be displayed on display 54 at a set of display positions. When selecting symbols, the random number generator 621 may select symbols from the set of symbols 641 to correspond to elements for entry into a community game. For example, symbols, such as aces, may be employed in the main game according to the main game rules, but if they are displayed in designated display positions they are deemed as collected. In addition, if a designated number of these aces are collected in this manner, an element (pair of aces) for eligibility is deemed as being collected and the pair of aces can be employed in the community game.

The outcome evaluator 623 may evaluate the main game outcome generated by the outcome generator 622, which is displayed as symbols arranged at a set of display positions, to determine if the outcome corresponds to a winning combination specified in the prize data 642A based on game rules 642. For example, the game rules of the main game may specify that all combinations are evaluated left to right or can be evaluated right to left or both. Also, to obtain a desired return to player, a probability table having weighted outcomes may be stored in the game rules 642 and employed when selecting the symbols. In addition, further rules for determining an element for eligibility into a community game may also be stored in memory 64. For example, the game rules may specify an element is a playing card symbol, such as an ace, or a combination of symbols, such as any pair. It would also be appreciated by those skilled in that art that the element may be specified by the game rules to only be deemed as collected if it is displayed in a designated position or on a played win-line. Alternatively, symbols corresponding to an element may be specified as scatter type symbols. Also, the game rules 642 may contain a probability table employed to determine how often an element is to be deemed as collected and it would be appreciated by those skilled in the art that the probability of collecting an element could be influenced by player activity, such as the value of a main game wager, number of win lines played, etc. In order to assist, game outcomes evaluated by the outcome evaluator 623 may be stored in memory 64 as meter data 643, which may also include community game outcomes, for influencing game outcome.

In an example, the probability of collecting a pair of playing card symbols in the main game for eligibility into a poker type community game may be proportional to the value of a main game wager selected to be played by a playing using the game play mechanism 56. For example, the probability of collecting a pair of playing card symbols may be 1 in 100 if one credit is played per line in the main game and 1 in 20 if 5 credits per line are played. Furthermore, a probability table may be employed to affect the probability of collecting a higher ranked pair according to the value of the main game wager.

In another embodiment, the game rules 642 may specify the element collected in the main game to be a symbol corresponding to a bingo card, whereby the bingo card displays a plurality of symbols to be collected in a community game of bingo. In this embodiment, the eligibility determiner 626 determines if one or more symbols displayed in a main game outcome correspond to a bingo card. The number of bingo cards collected may affect the probability of making a community game award. Alternatively, the bingo card may have varying numbers of symbols displayed to be collected to affect the probability of making a community game award.

In another embodiment, the element collected in the main game corresponds to mahjong tiles for a community game of mahjong. Alternatively, the element may be a keno card for a game of keno. In any case, the symbols corresponding to the elements (mahjong tiles or keno cards) are stored in the game rules 642 and determined to be elements for eligibility into the community game by the eligibility determiner 626 as above.

Also, as described, the community game may be a different game to the main game with different rules. The rules may be stored in memory 74 as game rule data 742. The community game controller 70 may also include a community game outcome determiner 722 to determine the outcome of the game. Alternatively, the outcome evaluator 623 of each gaming machine may perform this function.

In an example, the community game controller 70 may be arranged to conduct a community game of poker for players of gaming machines determined to be eligible by respective eligibility determiners 626. In this example, each eligible player has collected an element in the main game corresponding to a pair of playing card symbols which form player hole cards. The community game controller 70 is arranged to select five playing cards to be community cards in the community game according to the game rules 742. Each player then forms a player hand by combining at least one hole card with desired community cards to form the highest ranked poker hand. The community game outcome determiner 722 then evaluates the player hands and a community game award is made to the player with the highest ranked hand. Alternatively, the community game award may be a series of awards based on the hands formed, such as in Caribbean stud poker. For example, the community game outcome determiner 722 may determine, according to the game rules 742, that each player with two pairs is to be awarded 10 credits and each player with a full house is to be awarded 50 credits.

In another example, the community game controller 70 may be arranged to conduct a community game of bingo for players of gaming machines determined to be eligible. In this example, each player has collected symbols corresponding to a bingo card element to be collected in the main game. The community game controller 70 is arranged to select a number of symbols in the game of bingo according to the game rules 742 and each player matches selected generated symbols to the plurality of symbols displayed on each bingo card. The community game outcome determiner 722 then evaluates the completed player bingo cards and a community game award is made to each respective player with the displayed symbols on the bingo card matched.

In another embodiment, the community game may only be conducted when a start condition is met, i.e. the players may collect elements for eligibility into the community game but the community game is not triggered for these players until the start condition is met. In this case, the community game module 624 may include a start condition determiner 626, as shown in FIG. 7, to determine if an event occurs on a gaming machine which corresponds to a start condition. For example, the event may be a main game outcome trigger event such as a designated number of elements to be collected by a designated number of players, or the start event may be a designated number of games played. Alternatively, the start condition may not be a game event but may be a designated time period elapsing in the main game before the community game is to be conducted for eligible players.

The community game module 624 may display the status of the start condition to the player of the gaming machine via the display controller 625. For example, when the start condition is a time, the player is displayed the time until the next community game is conducted. Alternatively, if the start condition is a total number of elements collected, such as corresponding to twenty pairs in a community game of poker, the number of pair collected and or remaining is displayed to each player via respective display controllers 625.

For example, if the community game is a game of poker, each player may need to collect a number of symbols in the main game, e.g. ten aces in designated display positions, for eligibility into the community game and to correspond to a pair of aces for use in the community game. The community game may not be conducted until a start condition, such as a designated number of symbols (one hundred aces) have been displayed in designated positions in the main game. In a further example, the community game may be conducted when a start condition corresponding to a number of collections of elements have been collected, e.g. symbols corresponding to ten pairs. The ten pairs could be collected by any number of players and are to be employed in determining the community game outcome as described above.

Figure 8:
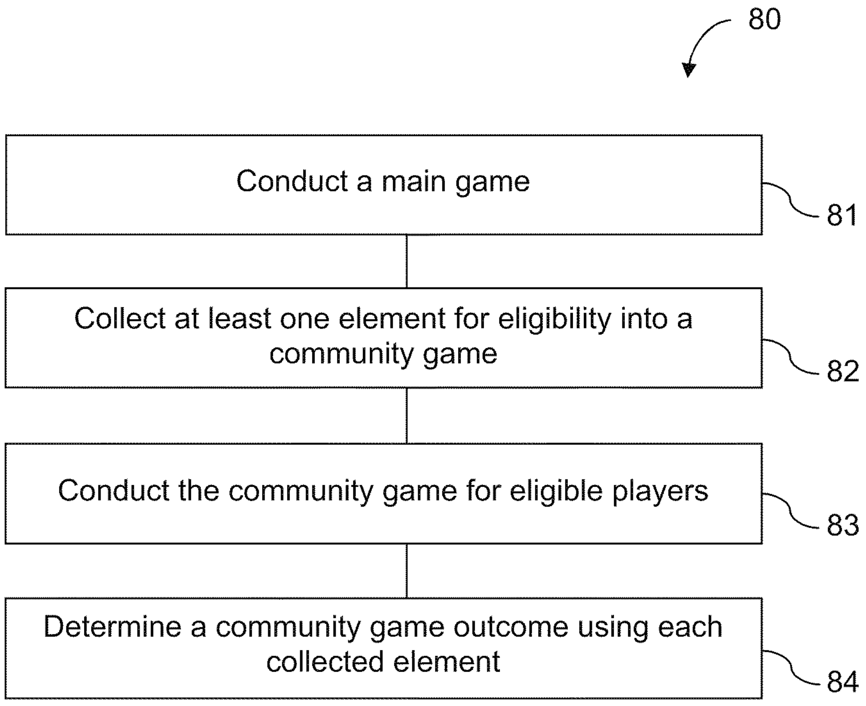
FIG. 8 is a flow chart of an embodiment.
Figure 9:
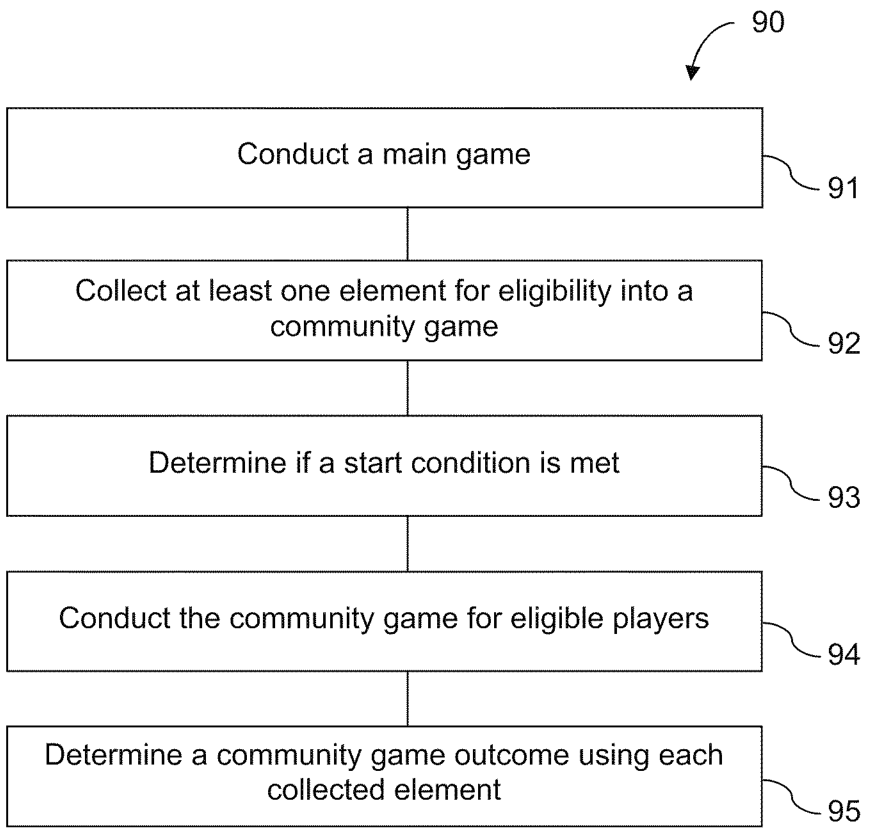
FIG. 9 is a further flow chart of an embodiment.

A method 800 of gaming is summarised in FIG. 8 and involves the steps of conducting a main game 810 where at least one element for eligibility into a community game is collected 820 and subsequently conducting the community game 830 for all eligible players. The method 800 then determines a community game outcome 840 using each collected element for each player. An alternate method 900 of gaming is summarised in FIG. 9 and involves the steps of conducting a main game 910 where at least one element for eligibility into a community game is collected 920, but determining 930 if a start condition is met before conducting the community game 940 for all eligible players. The method 900 also then determines a community game outcome 940 using each collected element for each player.

Further aspects of the method will be apparent from the above description of the system. It will be appreciated that at least part of the methods will be implemented digitally by a processor. Persons skilled in the art will also appreciate that the above methods could be embodied in program code. The program code could be supplied in a number of ways, for example on a tangible computer readable medium, such as a disc or a memory (for example, that could replace part of memory 103) or as a data signal (for example, by transmitting it from a server). Persons skilled in the art will appreciate that program code provides a series of instructions executable by the processor.

It will be understood to persons skilled in the art of the invention that many modifications may be made without departing from the spirit and scope of the invention, in particular it will be apparent that certain features of embodiments of the invention can be combined to form further embodiments.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It will be understood to persons skilled in the art of the invention that many modifications may be made without departing from the spirit and scope of the invention, in particular it will be apparent that certain features of embodiments of the invention can be combined to form further embodiments.

The invention claimed is:

1. A method of community gaming for playing a community game in a gaming system having a community game controller and a plurality of gaming machines, each gaming machine having 1) a credit input mechanism configured to accept a credit for establishing a credit balance, the credit balance being increasable and decreasable, and 2) a gaming controller, the method comprising:

receiving at a said credit input mechanism a main game wager to initiate play of a main game having a plurality of elements at each of the gaming machines, and decreasing the credit balance;

determining if an additional wager has been received in addition to the main game wager received at the said credit input mechanism, and further decreasing the credit balance;

increasing, via the gaming controller, a probability of a first element of said plurality of elements occurring during play of the main game in response to receiving the additional wager at the credit input mechanism;

determining, via the gaming controller, whether multiple ones of said plurality of elements have occurred at one of the plurality of gaming machines during play of the main game, the multiple ones of said plurality of elements contributing to a determination of whether a winning outcome occurs in the main game;

determining, via the gaming controller, whether the multiple ones of said plurality of elements that occurred, if any, during play of the main game satisfy eligibility criteria for play of the community game;

receiving, via the gaming controller, if eligibility criteria for play of the community game is satisfied, a selection of one of a plurality of options in response to determining multiple ones of said plurality of elements having occurred, the plurality of options comprising a first option wherein all of the multiple ones of said plurality of elements are entered for play of the community game, and a second option wherein a portion of the multiple ones of said plurality of elements are retained for entry into a subsequent community game;

collecting via the gaming controller in the main game any of said plurality of elements selected for entry into the community game, wherein each of said plurality of elements comprises at least one symbol to be used to form a player hand comprised of a plurality of symbols in the community game; and conducting via the community game controller the community game, in which the collected elements are employed in determining an outcome of the community game.

2. A method of community gaming as claimed in claim 1, further comprising collecting at least one further symbol in the community game in addition to the collected elements to form the player hand.

3. A method of community gaming as claimed in claim 2, wherein the symbols comprise playing card symbols in a game of poker.

4. A method of community gaming as claimed in claim 3, wherein a game round of poker comprises: collecting two playing card symbols to be player hole cards in the main game; selecting five playing card symbols to be community cards in the community game; and forming the player hand by combining at least one hole card and a number of community cards.

5. A method of community gaming as claimed in claim 4, wherein each element collected in the main game corresponds to a pair of playing card symbols.

6. A method of community gaming as claimed in claim 4, wherein each element collected in the main game corresponds to at least one playing card symbol being a picture symbol.

7. A method of community gaming as claimed in claim 4, further comprising making a community game award based on the community game outcome to each player with the player hand corresponding to a highest value in the game of poker.

8. A method of community gaming as claimed in claim 1, wherein each element collected in the main game comprises at least one bingo card displaying a plurality of symbols to be collected in a game of bingo.

9. A method of community gaming as claimed in claim 8, wherein a game round of bingo comprises: selecting symbols; matching selected symbols to the plurality of symbols displayed on the or each bingo card; and determining whether to make a community game award based on determining the matching symbols.

10. A method of community gaming as claimed in claim 1, wherein a number of collected elements affect a probability of making a community game award.

11. A method of community gaming as claimed in claim 1, wherein each element collected in the main game corresponds to mahjong tiles in a game of mahjong.

12. A method of community gaming as claimed in claim 1, wherein at least one of said multiple ones of said plurality of elements includes said first element.

13. A gaming system comprising:

a display;

a credit input mechanism configured to accept a credit for establishing a credit balance, the credit balance being increasable and decreasable, and to accept a main game wager to play a main game, thereby decreasing the credit balance, and to accept an additional wager in addition to the main game wager, thereby further decreasing the credit balance;

a game play mechanism operable by at least one player to receive input from each player in the main game;

at least one game controller including at least one main game controller and a community game controller;

wherein the at least one main game controller is configured to conduct the main game to collect multiple ones of a plurality of elements for eligibility into a community game by the at least one player, wherein a probability of collecting said multiple ones of said plurality of elements in the main game for eligibility into the community game is proportional to a value of the main game wager including increasing the probability of collecting said multiple ones of said plurality of elements during play of the main game in response to receiving the additional wager, the main game controller being further configured to determine whether said multiple ones of said plurality of elements contribute to a winning outcome in the main game;

wherein the community game controller is configured to conduct the community game for eligible players; and wherein the at least one game controller is configured to provide a plurality of options in response to the collection of said multiple ones of said plurality of elements comprising a first option to have all of said multiple ones of said plurality of elements employed in determining the community game outcome, and a second option wherein a portion of said multiple ones of said plurality of elements are retained for entry into a subsequent community game, and wherein each element collected in the main game by each player comprises at least one symbol to be used to form a player hand comprised of a plurality of symbols in the community game.

14. A gaming system as claimed in claim 13, wherein the community game controller is further configured to conduct the community game to collect at least one further symbol in addition to the at least one symbol collected in the main game to form the player hand.

15. A gaming system as claimed in claim 14, and wherein the game play mechanism is further operable to receive input from each player to collect symbols in either one or both of the main game and community game to form the player hand.

16. A gaming system as claimed in claim 15, wherein the symbols comprise playing card symbols in a game of poker.

17. A gaming system as claimed in claim 16, wherein the community game controller is further configured to make a community game award based on the community game outcome to each player with the player hand corresponding to a highest value in the game of poker.

18. A gaming system as claimed in claim 13, wherein each element collected in the main game comprises at least one bingo card displaying a plurality of symbols to be collected in a game of bingo.

19. A gaming system as claimed in claim 18, wherein the community game controller is further arranged to conduct the community game to select symbols and match selected symbols to the plurality of symbols displayed on the or each bingo card, and determine whether to make a community game award based on determining the matching symbols.

20. A gaming system as claimed in claim 13, a number of collected elements affects a probability of making a community game award.

* * * * *